United States Patent
Assouline et al.

[11] 4,088,400
[45] May 9, 1978

[54] DISPLAY DEVICES

[75] Inventors: Georges Assouline; Michel Hareng; Michel Roncillat; Eugéne Leiba, all of Paris, France

[73] Assignee: Thomson-CSF, Paris, France

[21] Appl. No.: 427,304

[22] Filed: Dec. 21, 1973

[30] Foreign Application Priority Data

Dec. 29, 1972 France .................... 72.46907

[51] Int. Cl.² ............ G03B 21/14; G02B 5/30; G02F 1/01
[52] U.S. Cl. .................... 353/20; 350/150
[58] Field of Search ............ 353/20, 10, 25, 102, 353/122; 350/150, 275, 160 P, 160 LC, 159

[56] References Cited

U.S. PATENT DOCUMENTS 3,067,413  12/1962  Fischle et al. .................... 350/150

Primary Examiner—Harry N. Haroian
Attorney, Agent, or Firm—Cushman, Darby & Cushman

[57] ABSTRACT

An improvement in electro-optical display devices utilizing polarized light is disclosed, in which the linearly polarized light emerging from the display device is picked up by a diffuser and reaches the observer eyes after passing through a linear polarizer. The contrast is thus enhanced and the display can be used in presence of strong ambient lighting. The contrast can be still further improved by arranging at either side of the diffuser two suitably oriented quarter-wave plates.

6 Claims, 5 Drawing Figures

DISPLAY DEVICES

BACKGROUND OF THE INVENTION

The present invention relates to an improvement in electro-optical display devices utilizing polarized light.

Those skilled in the art will be aware that unlike display devices which themselves generate light, such as cathode ray tubes, discharge tubes, electroluminescent diodes and so on, electro-optical display devices operate by modulating transmitted or reflected light emanating from an external source.

The majority of electro-optical devices utilizes polarized light. For many of them, this is a mandatory condition since it is linked with their principle of operation; such is the case with devices in which a plate of material is subjected to an electric field, producing variation either in the double refraction property of the plate (K.D.P., nematic liquid crystals), or in its rotating power (cholesteric liquid crystals or nematic liquid crystals exhibiting a twisted structure). In other devices, such as liquid crystals utilizing the dynamic scattering effect, polarized light may be used simply to improve contrast. Whatever the case, the electro-optical plate is illuminated by linearly polarized light, either from a laser source, or more generally from a conventional natural light source associated with a polarizer; the light coming from the plate reaches the observer's eye, after passing through a polarizer doing duty as analyser.

In the majority of these devices, the modulator has to be illuminated with parallel light and this limits the angle within which it is visible. It is possible to increase the viewing angle by arranging a diffuser between the observer and the exit polarizer; however, there is then a loss of contrast which is the greater the higher the ambient lighting level, since the observer's eye then receives, superimposed upon the light coming from the modulator, a substantial part of the ambient light which is scattered by the diffuser.

SUMMARY OF THE INVENTION

The object of the invention is to overcome the aforesaid drawbacks by the interposition, in such display device, between the exit polarizer which they necessarily comprise, and the observer's eye, of a diffuser associated with an additional polarizer. The viewing angle thus can be increased without any loss in contrast.

BRIEF DESCRIPTION OF THE DRAWING

A complete understanding of this invention and of the above noted and other features thereof may be gained from consideration of the following detailed description and the accompanying drawing, in which.

DETAILED DESCRIPTION OF THE PREFERRED EMBODIMENTS

Figure 1:
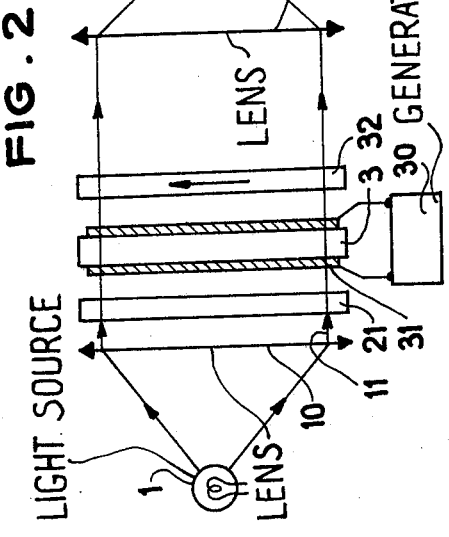
FIG. 1 illustrates a first embodiment of the improvement in accordance with the invention.

FIG. 1 provides an example of an improvement, in accordance with the invention, to electro-optical display devices, in the case where the modulator device is observed in the direct viewing mode.

In this figure, a natural light source 1 can be seen, located at the focus of a lens 10 from which a parallel light beam 11 emerges. A first polarizer 21 and a plate 3 of an electro-optical material equipped on its two faces with two transparent electrodes 31 and 32, themselves electrically connected to a variable voltage generator 30 are arranged in the trajectory of the trajectory of the beam 11. This beam then encounters a second polarizer 22, a diffuser 4 and a third polarizer 23, disposed parallel to the polarizer 22.

The assembly constituted by the plate 3, its electrodes 31 and 32, the generator 30 and the polarizer 22, constitutes a prior art kind of electro-optical modulator. To operate correctly, the modulator must be illuminated with linearly polarized light. Therefore, it is associated with a laser type source directly emitting such light, or, as shown in FIG. 1, with a source of natural light, white or monochromatic, associated with a linear polarizer.

The plate 3 can be constituted by some suitable crystalline solid, K.D.P. for example, or by a thin liquid crystal film, cholesteric, smectic or nematic, and can employ an electro-optical effect, such as double refraction, rotatory power or dynamic scattering.

The transparent electrodes 31 and 32 constituted for example by tin oxide deposits, take the shape of the symbol which the device is to display; by applying the voltage produced by the generator 30, this symbol appears depending upon the nature of the source, the electro-optical effect utilized and the respective orientations of the polarizers 21 and 22, either as a bright symbol against a dark background, a dark symbol against a bright background or a symbol whose color differs from the background color; one of the electrodes can also be uniform. Other more elaborate known arrangements can replace the electro-optical modulator shown in FIG. 1; for example one of the faces of the plate can carry separate electrodes, whose combination gives the possibility of displaying different symbols; each face of the plate can equally well comprise a set of electrodes in the form of regularly spaced parallel bands, the two sets being mutually perpendicular; it is also possible, using the same modulator to display several symbols, to superimpose several electrodes each representing one of the symbols, insulating them from one another by means of a thin dielectric film.

At the exit of the polarizer 22, the light beam becomes a parallel beam; the field of view of the device is thus the more restricted the better the parallelism of the beam 11. To overcome this difficulty, it is known to supplement the device by the inclusion of a diffuser 4 on to which, because of the parallelism of the beam 11, the symbols displayed by the modulator are projected in cast shadow fashion. However, if the diffuser is viewed in the presence of ambient lighting, it scatters back to the observer's eye part of the ambient light and this substantially reduces the contrast between the displayed symbols and the background.

Improvement in accordance with the invention, which makes it possible to very substantially attenuate the effect of the ambient light, consists in associating with the diffuser 4, the polarizer 23 which is disposed substantially parallel to the polarizer 22. The ambient light, which is natural unpolarized light, is then attenuated by half before reaching the diffuser, this presuming that the polarizer has zero absorption for the polarization which is transmitted; if, moreover, the polarizer, as in the case of dichroic polarizers, of "Polaroid" for instance, has a not insubstantial absorption A (in the order of 25% in the case of "Polaroid" polarizers), the ambient light received by the diffuser will be attenuated by 0.5 × (1-A). By contrast, the light coming from the modulator, the linear polarization direction of which, imposed by the polarizer 22, is parallel to the polarization direction of the polarizer 23, as well as the ambient light scattered back by the diffuser 4, will pass through the polarizer 23 without attenuation if the latter is a perfect polarizer, and with an attenuation of (1-A) if it has an absorption other than zero.

As far as the eye of the observer is concerned, the presence of the polarizer 23 attenuates by a factor (1-A) the light emanating from the modulator, and by a factor 0.5 (1-A)$^2$ the back-scattered ambient light.

To facilitate understanding, the elements 3, 22 and 4 have been shown, in FIG. 1, spaced apart from one another. In practice, in order to avoid the need to use a strictly parallel illuminating beam whilst retaining good definition in the displayed symbols, these different elements are arranged as close together as possible. The diffuser 4 is chosen in such a way as to modify as little as possible the polarization of the light which it transmits, and if required, can be orientated in relation to the polarizers 22 and 23 in such a manner as to provide maximum transmission of the light emanating from the modulator. To prevent reflection of ambient light at that face of the polarizer 23 opposite the observer, said face can receive an anti reflection coating or be given a matt finish.

The above described combination of a linear polarizer and a diffuser has been utilized with a character display device employing the properties of double refraction of a nematic liquid crystal subjected to an electric field; a perfectly legible display with an effective illumination level not exceeding 1500 lux, in the presence of an ambient illumination of 10000 lux may thus be achieved.

Figure 2:
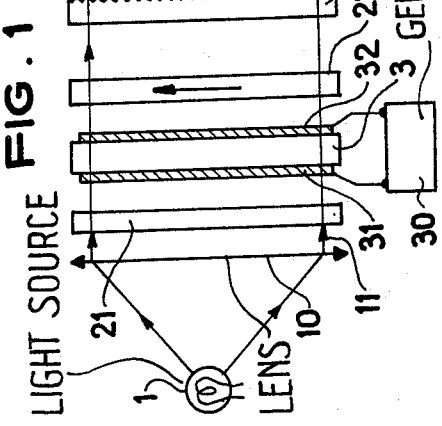
FIG. 2 illustrates a second embodiment of the improvement in accordance with the invention.

FIG. 2 illustrates a second example of the improvement in accordance with the invention, applied to the case where the light coming from the modulator is projected by an optical system on to the diffuser. In this figure, the same elements are to be seen, as are marked in FIG. 1 by the corresponding references. In addition, there is an objective lens 5 which projects the image of the plate 3 onto the diffuser 4. In other respects, the operation of the device is identical in all points with that of the device shown in FIG. 1.

Figure 3:
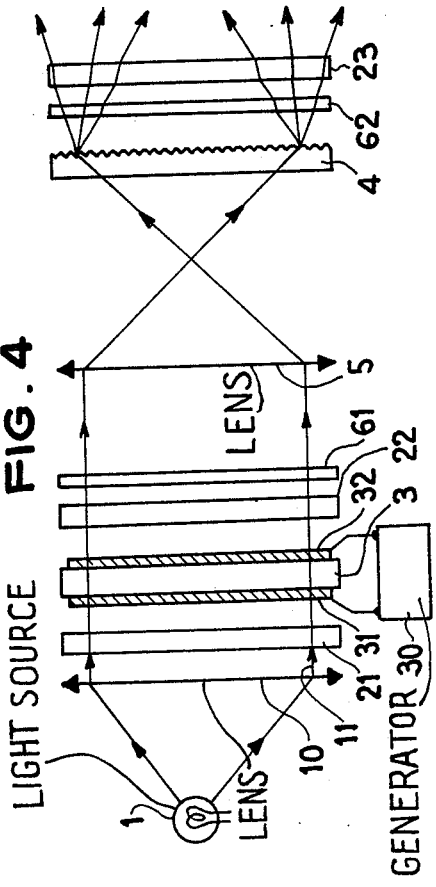
FIGS. 3 and 4 illustrate an improvement in accordance with the invention, applied respectively to the devices of FIGS. 1 and 2.
Figure 4:
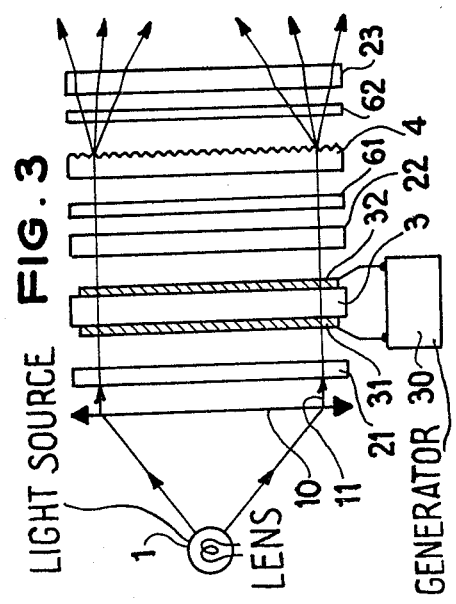

FIGS. 3 and 4 describe an improvement respectively to the devices of FIGS. 1 and 2. Under the same references, the same elements are to be found there. There will also be seen a first quarter wave plate 61 arranged between the polarizer 22 of the diffuser 4, and a second quarter wave plate 62, arranged between the diffuser 4 and the polarizer 23. In contradistinction to FIGS. 1 and 2, the orientation of the polarizer 23 in relation to that of the polarizer 22, is a matter of arbitrary choice. The orientations of the quarter wave plates in relation to the polarizers are such that for an observer looking at the device from the source 1, the direction of polarization of the polarizer 22 needs rotating through an angle of − 45° in the trigonometric sense, in order to bring it into coincidence with the slow axis of the quarter wave plate 61, whilst the direction of polarization of the polarizer 23 needs rotating through an angle of + 45° in order to bring it into coincidence with the slow axis of the quarter wave plate.

The combination of a linear polarizer and a quarter wave plate whose neutral axes are at 45° to the direction of polarization of the polarizer, constitutes a circular polarizer which, from natural or linearly polarized light, produces circularly polarized light; this light is polarized in right-hand or left-hand directions depending upon whether the 45° angle through which the polarization direction must be rotated in order to bring it into alignment with the slow axis, is negative or positive. A circular polarizer which produces cicularly polarized light of one sign, will transmit the whole of this light; on the other hand, it will totally block out polarized light of opposite sign.

Figure 5:
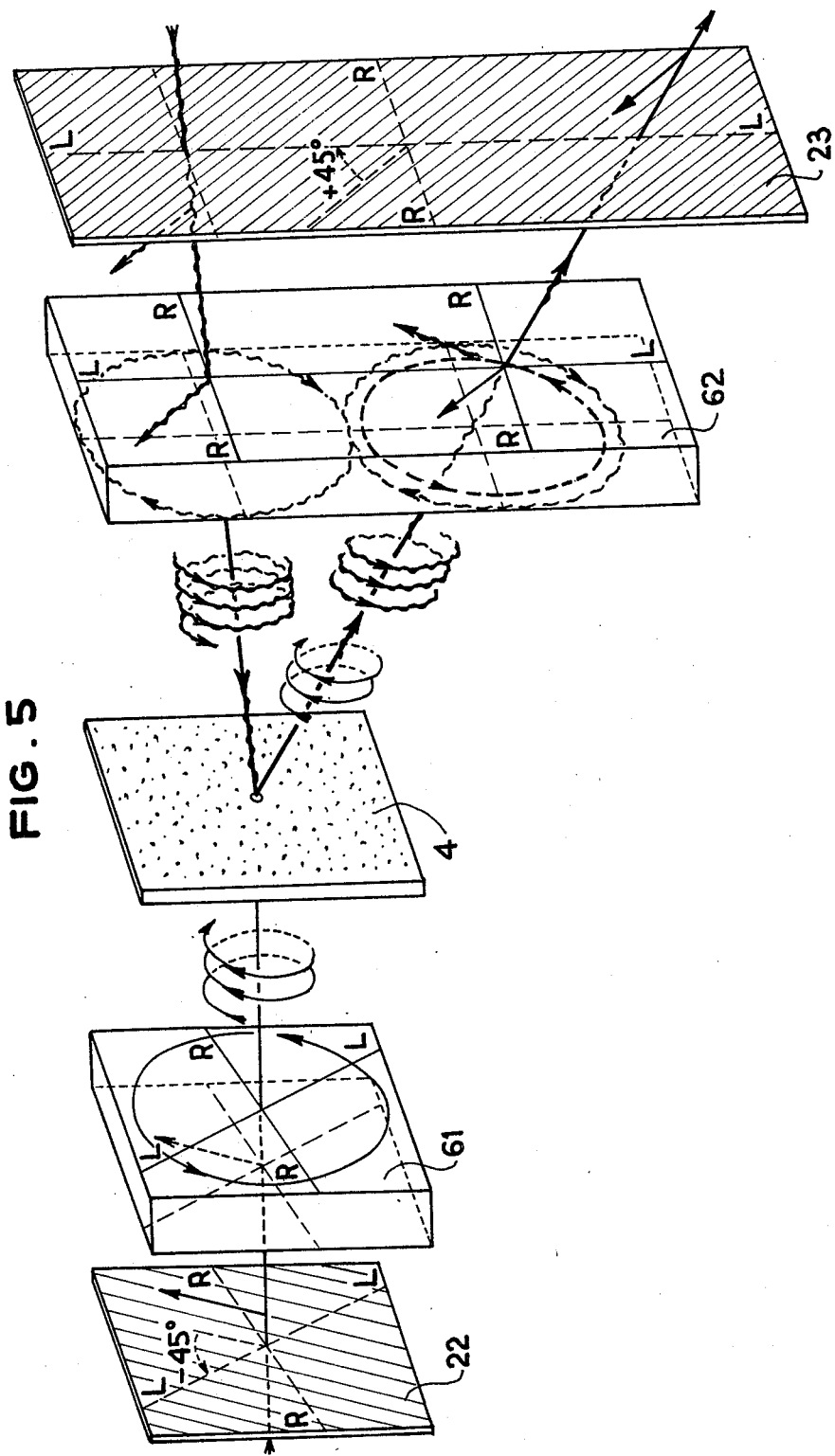
FIG. 5 is a diagram which explains the operation of the devices in accordance with the invention as shown in FIGS. 3 and 4.

As FIG. 5 shows the linearly polarized light transmitted by the linear polarizer 22 and coming from the electro-optical plate 3, is converted to right-hand circularly polarized light by the quarter wave plate 61; this light, which retains its direction of rotation after passing through the diffuser 4, is transformed again, after passing through the quarter wave plate 62, into linearly polarized light parallel to the direction of polarization of the linear polarizer 23; the light emanating from the modulator is thus transmitted in full to the observer's eye.

By contrast, the ambient light has to pass a first time through the polarizer 23 and the quarter wave plate 62 before reaching the diffuser; after back-scattering, it passes through the quarter wave plate 62 again, and is stopped by the polarizer 23; in other words, the circular polarizer constituted by the polarizer 23 and the quarter wave plate 62, produces right-hand circular light from the ambient light; however, circularly polarized light, at reflection, reverses its direction of propagation but retains its direction of rotation; this right-hand circularly polarized light is thus transformed, after back-scattering from the diffuser 4, into left-hand circularly polarized light whose direction of rotation is thus opposite to that of the scattered light coming from the modulator; this back-scattered light, after passing through the quarter wave plate 62, is converted into linearly polarized light at 90° to the linear polarization of the light coming from the modulator, and thus at 90° to the polarization of the linear polarizer 23, with the result that it is wholly blocked.

It is possible, of course, without departing from the scope of the invention, and considering FIGS. 3, 4 and 5 to modify the orientation of the quarter wave plate 61 and 62 in relation to the polarization directions of the polarizers 22 and 23, by simultaneously rotating these two plates through 90°. The circular polarizers constituted by the assembly of the linear analyser and the quarter wave plate, then each produce left-hand circularly polarized light instead of right-hand circular polarized light.

It is equally obvious that in the device shown in FIGS. 3 and 4, one of the quarter wave plates or indeed both, can be replaced by three-quarter wave plates, five-quarter wave plates etcetera, etcetera, provided that the neutral axes are suitably aligned in relation to the polarization direction defined by the linear analyser. It should be borne in mind in this context that the direction of rotation of the circularly polarized light produced by a circular polarizer, remains unchanged if the quarter wave plate introducing a phase shift of $\pi/2$, is replaced by a plate having the same neutral axis orientation, but introducing a phase-shift equal to $(1 + 4k) \pi/2$ or by a plate having its neutral axes orientated at 90° to the preceding quarter wave plate and introducing a phase shift equal to $(3 + 4k) \pi/2$ (where $k$ is an arbitrary integer).

It is essential for the proper operation of the improvement hereinbefore described, not only that the diffuser 4 should not depolarize the light which it scatters, but also that it should be perfectly isotropic vis-a-vis the polarized light so that it does not convert to elliptical light the circularly polarized light which it scatters or back-scatters. By way of non-limitative example, the paper "Kodatrace" constitutes a suitable diffuser.

In the context of the device shown in FIG. 3, a very compact combination can be achieved by attaching to either side of a "Kodatrace" diffuser sheet, right-hand or left-hand circular polarizers cut from one and the same sheet of type "Polarod HNCP 37" circular polarizer.

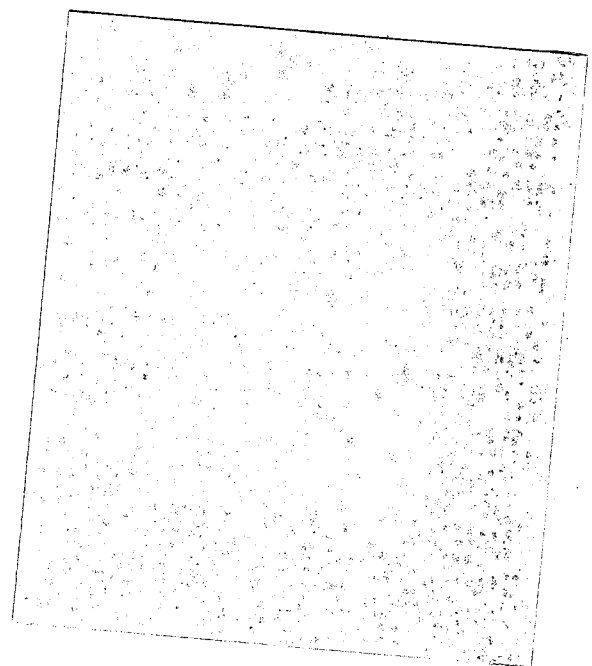

What we claim is:

1. A display device comprising means for producing a parallel beam of linearly polarized light, and successively positioned for receiving said light; electro-optical modulating means, first linear polarizer means having a first polarization direction, diffuser means and second linear polarizer means having a second polarization direction.

2. A device as claimed in claim 1, wherein said first and second polarization directions are mutually parallel.

3. A device as claimed in claim 1, wherein that face of said second linear polarizer means which is opposite said diffuser means, has an anti-reflection coating.

4. A device as claimed in claim 1, wherein first and second optical phase-shift means are positioned for receiving said light respectively between said first polarizer means and said diffuser means and between said diffuser means and said second polarizer means.

5. A device as claimed in claim 4, wherein each said first and second optical phase-shift means respectively introduce, between two mutually perpendicular preferred directions of vibration, an optical phase-shift equal to an odd multiple of a quarter wave length; said wave length being the mean wave length of said polarized light; said two preferred directions of said first and of said second phase-shift means making an angle of 45° respectively with said first and second polarization directions.

6. A device as claimed in claim 1, wherein optical projection means are arranged between said modulator means and said diffuser means and facing said first polarizer means to project the image of said modulating means on to said diffuser means.

* * * * *